(12) United States Patent
Mewherter et al.

(10) Patent No.: US 8,904,267 B2
(45) Date of Patent: Dec. 2, 2014

(54) RETRIEVING SLIDE SHOW CONTENT FROM PRESENTATION DOCUMENTS

(75) Inventors: Duncan L. Mewherter, Acton, MA (US); Amy D. Travis, Arlington, MA (US); Koah-Hsing Wang, Winchester, MA (US); Robert C. Weir, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 1607 days.

(21) Appl. No.: 10/685,192

(22) Filed: Oct. 14, 2003

(65) Prior Publication Data

US 2005/0091579 A1    Apr. 28, 2005

(51) Int. Cl.
*G06F 17/24* (2006.01)
*G06F 17/21* (2006.01)
*G06F 17/22* (2006.01)
*G06F 17/25* (2006.01)

(52) U.S. Cl.
CPC .......... *G06F 17/211* (2013.01); *G06F 17/2264* (2013.01)
USPC ............................ 715/200; 715/204; 715/230

(58) Field of Classification Search
USPC ....................................... 715/500.1, 500, 200
See application file for complete search history.

(56) References Cited

U.S. PATENT DOCUMENTS

| | | | |
|---|---|---|---|
| 6,081,262 A * | 6/2000 | Gill et al. ...................... | 715/202 |
| 6,108,696 A * | 8/2000 | Mendhekar et al. ........... | 709/217 |
| 6,674,900 B1 * | 1/2004 | Ma et al. ........................ | 382/176 |
| 6,704,024 B2 * | 3/2004 | Robotham et al. ............ | 345/581 |
| 6,801,673 B2 * | 10/2004 | Chao et al. ..................... | 382/282 |
| 7,162,691 B1 * | 1/2007 | Chatterjee et al. ............ | 715/513 |
| 7,853,866 B2 * | 12/2010 | Tanaka ........................... | 715/205 |
| 2002/0152234 A1 * | 10/2002 | Estrada et al. ............. | 707/501.1 |
| 2004/0071453 A1 * | 4/2004 | Valderas ........................ | 386/125 |
| 2004/0090462 A1 * | 5/2004 | Graham ......................... | 345/767 |
| 2004/0095376 A1 * | 5/2004 | Graham et al. ................ | 345/716 |
| 2004/0194026 A1 * | 9/2004 | Barrus et al. .................. | 715/515 |
| 2004/0194035 A1 * | 9/2004 | Chakraborty .................. | 715/531 |
| 2004/0202349 A1 * | 10/2004 | Erol et al. ..................... | 382/100 |
| 2013/0167033 A1 * | 6/2013 | Skwarecki et al. ........... | 715/719 |

OTHER PUBLICATIONS

DzSoft, "Turn PowerPoint presentations into standalone Slide Shows," published on the Internet at least as of Oct. 1, 2003, downloaded from: http://web.archiv.org/web/20031001171832/dzsoft.com/dzshow-powerpoint.htm, downloaded pp. 1-4.*

(Continued)

*Primary Examiner* — James J Debrow
(74) *Attorney, Agent, or Firm* — Steven M. Greenberg, Esq.; CRGO Law

(57) ABSTRACT

The present invention is a system, method and apparatus for converting a slide show presentation for use within a non-presentation application such as a Web conferencing or virtual classroom application. In accordance with the present invention, a slide show presentation in its native format can be processed to extract slide title information for each slide in the slide show presentation. Additionally, important text within slide further can be extracted. Each slide in the slide-show can be converted to a raster image and disposed within markup. The markup can be annotated with the important text and both the markup and the slide title can be provided to the non-presentation application for use in concert with the non-presentation application. In this way, the context of each slide can be preserved for use within the non-presentation application as can an image of each slide itself.

13 Claims, 2 Drawing Sheets

(56) References Cited

OTHER PUBLICATIONS

Graham, "XHTML 1.0 Language and Design Sourcebook, The Next Generation of HTML," Wiley Computer Publishing, copyright 2000, Cover, copyright page, and p. 249.*

O'Haver, "Putting Kid Pix SlideShows on the Web," presented at the Annual Meeting of the Maryland Instructional Computer Coordinator's Association (MICCA), Mar. 26 and 27, 1998, downloaded from: www.wam.umd.edu/~toh/slideshow/, downloaded pp. 1-8.*

"NUI ITS Power Point Web Conversion Steps (Nov. 8, 2001)," downloaded from: www.its.niu.edu/its/www/powerpointfaq.shtml, one page.*

DzSoft Slide Show, home page, downloaded from: http://web.archive.org/web/20020610034346/dzsoft.com/dzshow.htm, 2 pages.*

Liddle et al.,"Automatically Extracting Structure and Data from Business Reports", ACM, 1999, pp. 86-93.*

Rosenfeld et al.,"Structural Extraction from Visual Layout of Documents", 2002, ACM, pp. 203-210.*

Hu et al.,"Automatic Extraction of Titles from General Documents using Machine Learning", ACM, 2005, pp. 145-154.*

* cited by examiner

RETRIEVING SLIDE SHOW CONTENT FROM PRESENTATION DOCUMENTS

BACKGROUND OF THE INVENTION

1. Statement of the Technical Field

The present invention relates to the field of presentation application software and more particularly to processing presentation documents independently of the operation of a presentation application.

2. Description of the Related Art

Presentation software has formed the basis of corporate communications for well over a decade. Within the confines of the modern conference room, it has become nearly impossible to engage in oral discussion of a proposal without the use of a computer generated slide show. In this regard, the computerized presentation has become the mainstay of the oral presentation. Generally speaking, in a computerized presentation, a sequence of digital renderings of slides can be presented, either directly through a computer screen, or even through a projector or plasma presentation monitor. The individual slides, themselves, can include textual, audible and visual elements, including animated elements.

The prototypical presentation application includes a document processor, much like a word processor, in which the textual, visual and audible elements can be combined within a single slide show presentation. In this regard, each individual slide generally can follow a prescribed template, which can range from a free form workspace, to a highly structured arrangement of text, imagery and audio. In most cases, each slide will include a slide title and a slide body. While the slide title generally can include text only, the slide body can include free form text, bulleted or numbered lists, a picture, graph, chart, animation, audio and other such combinations.

While many presenters "play back" a slide-show presentation through the presentation interface of the presentation application, often it can be desirable to facilitate the playback of a presentation in the absence of a presentation application. In this regard, most presentation applications provide a tool for transforming a slide show presentation to a "stand-alone" presentation. In the stand-alone presentation mode, a slide-show viewer can be incorporated with the slide show such that the slide show can appear to be self-executing. Alternatively, a freely distributable slide show viewer can be distributed in concert with the distribution of a slide show so as to obviate the requirement that a recipient of the slide show presentation purchase an expensive license for presentation software.

Notably, conventional presentation software applications provide a mechanism for converting a traditional presentation configured for display with the application, to a markup language representation of the presentation for display within a content browser. In this regard, the conventional presentation application can retrieve each contextual element of the slide through the presentation application and can format the contextual elements using markup language tags equivalent to the proprietary formatting instructions of the presentation. Nevertheless, to convert a presentation to a markup language representation requires access to the presentation application.

Recently, the increasing popularity of Web conferencing and virtual classroom software has presented new challenges to the presentation of a slide show without the benefit of presentation software. In particular, presenters who generate slide shows for incorporation in a classroom or in an on-line conference generally convert the slide show to mere raster representations of the slides for inclusion in the conferencing or classroom application. By generating a bit-mapped raster representation, however, the content of the slide show becomes an ordinary image and any internal meaning will have become lost.

It will be recognized by the skilled artisan that to accomplish full integration with a non-presentation application, a contextual understanding of each slide in a slide show presentation can be important. In particular, some applications require access to the textual elements of a slide show so as to meet accessibility requirements. As an example, screen reader technologies for the visually impaired must be able to process the text contained in a slide show. Other applications would prefer access to the textual elements of a slide show so as to properly process each slide in a manner suitable for the particular application. For instance, in a Web conferencing or virtual classroom environment, it would be helpful to be able to generate an agenda from text within a slide show. Yet, once a slide show has been converted to raster imagery, it is no longer possible to extract the text from the slide show.

SUMMARY OF THE INVENTION

The present invention addresses the deficiencies of the art in respect to slide show presentation processing and provides a novel and non-obvious method, system and apparatus for converting slide show presentations for use in non-presentation applications. A system for converting slide show presentations for use within non-presentation applications can include a slide show produced by a slide show presentation application and stored in a native format; and, a slide show conversion process configured for coupling to a non-presentation application and programmed both to extract contextual data from the slide show in its native format, and also to convert associated slides in the slide show to raster imagery for use in the non-presentation application. The contextual data can include a slide title for each one of the associated slides. Moreover, the contextual data can include important text associated with each one of the associated slides. Notably, the slide show conversion process further can include programming for generating a markup language document and for disposing the contextual data and the raster imagery within the markup language document.

A method for converting a slide show presentation for use within a non-presentation application can include extracting a slide title for a first slide in the slide show presentation; converting the first slide into a raster image; and, disposing both the slide title and the raster image in a markup language document. Each of the extracting, converting and disposing steps can be repeated for a selected group of other slides in the slide show presentation. Additionally, the method further can include the step of further extracting important text from the first slide; annotating the raster image of the first slide in the markup language document with the extracted important text; and, further repeating the repeating, further extracting and annotating steps for a selected group of other slides in the slide show presentation.

In a preferred aspect of the invention, the further extracting step can include further extracting text having formatting characteristics within the first slide which emphasizes the text. In this regard, the formatting characteristics can include a point size which exceeds a threshold value. The annotating step, by comparison, can include the step of generating an ALT tag with the important text in association with the raster image in the markup language document. Moreover, the generating step further can include the step of formatting the ALT tag with additional inline indicators for facilitating an audible playback of the important text in a non-presentation application.

Importantly, the markup language document can be processed in a non-presentation application. In particular, the processing step can include the step of generating an agenda with each slide title for each raster image in the markup language document. Moreover, each slide title can be linked to a corresponding raster image of the slide in the markup language document. Not only can the markup language document be processed in a non-presentation application, but also each of the extracting, disposing, converting and repeating steps can be performed externally to a slide show presentation application which produced the slide show presentation.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for converting a slide show presentation for use within a non-presentation application such as a Web conferencing or virtual classroom application. In accordance with the present invention, a slide show presentation in its native format can be processed to extract slide title information for each slide in the slide show presentation. Additionally, important text within in slide further can be extracted. Each slide in the slide-show can be converted to a raster image and disposed within markup. The markup can be annotated with the important text and both the markup and the slide title can be provided to the non-presentation application for use in concert with the non-presentation application. In this way, the context of each slide can be preserved for use within the non-presentation application as can an image of each slide itself.

Figure 1:
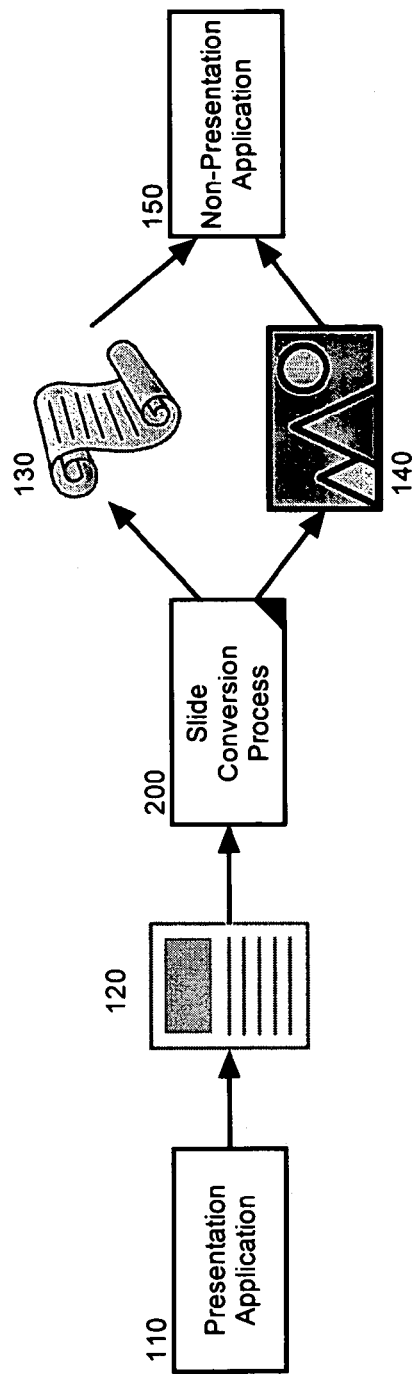
FIG. 1 is block diagram illustrating a system for converting slide show presentations for use in a non-presentation application; and, FIG. 2 is a flow chart illustrating a process for converting a slide show presentation for use in a non-presentation application.

FIG. 1 is block diagram illustrating a system for converting slide show presentations for use in a non-presentation application. The system can include a presentation application 110 configured to produce a slide show presentation 120. Conventional presentation applications include Power Point® manufactured by Microsoft Corporation of Redmond, Wash., United States, though the invention is not limited to any specific presentation application. The slide show presentation 120 can include any combination of textual, audible and visual elements as it is well-known in the art.

A slide show presentation conversion process 200 can process the slide show presentation 120 to both contextual elements 130 and an image or images 140 of the slides in the slide show. In this regard, the contextual elements 130 can include text extracted from the slide show presentation 120. In a preferred aspect of the invention, the contextual elements 130 can include the title for each slide and any text considered important. Notably, text is considered important based upon the characteristics of the text including the point size of the font, the color, the positioning, or the relationship between the text and any surrounding audiovisual elements, to name a few.

Finally, a non-presentation application 150 can be coupled to the slide show conversion process 200. The non-presentation application can include any application configured for execution in an operating system which has not been designed principally to generate a slide show presentation. Examples include Web conferencing software and virtual learning software. In any event, once the contextual elements 130 have been extracted, both the contextual elements 130 and the image or images 140 of the slide show presentation 120 can be provided to a non-presentation application 150 for use within the non-presentation application 150.

Specifically, where the non-presentation application 150 is a Web conferencing application, the image or images 140 of the slides in the slide show presentation 120 can be presented through a view of the Web conferencing application. Moreover, the contextual elements 130 can be processed separately within the Web conferencing application to produce an agenda for a meeting associated with the slide show presentation 120, or to facilitate accessibility requirements for visually impaired participants in the meeting. For instance, to the extent that the important text can be associated with a particular slide, the important text can be processed in a text-to-speech converter to audibly announce the context of the slide to a meeting participant unable to read text rendered within the image of the slide.

Importantly, by converting the slide show presentation 120 into the image or images 140 of the slides in the slide show presentation 120, the images 140 themselves can be resized to accommodate the display restrictions of pervasive devices such as PDAs and cellular telephones. By including the contextual elements 130 separately, the presentation 120 can be accessed within a pervasive device though the display restrictions of the pervasive device may inhibit the comprehension of the presentation. Nevertheless, the contextual elements 130 can be presented in a prominent manner, either audibly or visually, through the pervasive device to assist in the comprehension of the reduced image or images 140.

Figure 2:
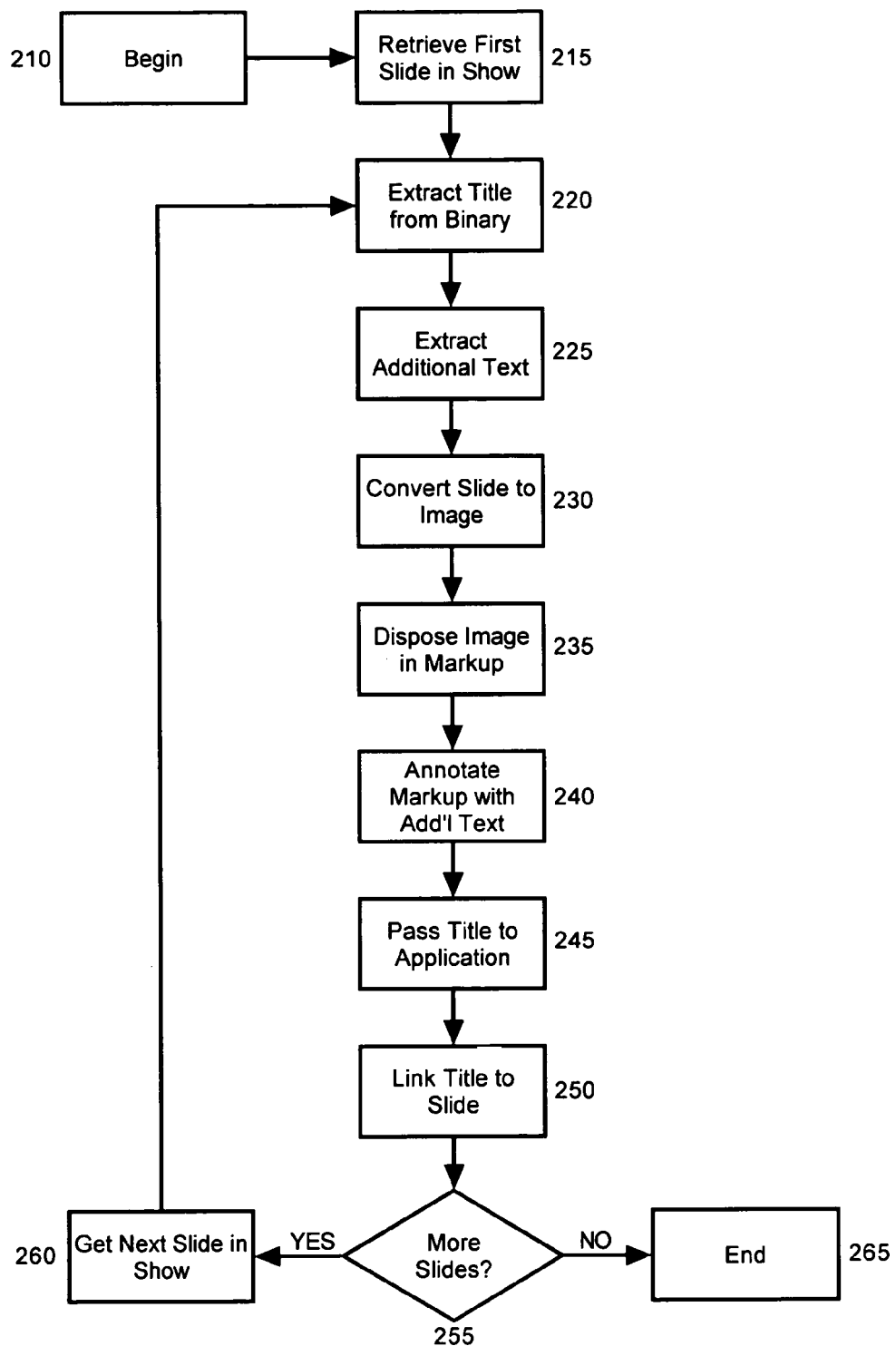

FIG. 2 is a flow chart illustrating a process for converting a slide show presentation for use in a non-presentation application. Beginning in block 210 leading into block 215, a first slide within the slide show can be retrieved for processing. In block 220, a title for the slide can be retrieved from the binary representation of the slide show in its native format. In block 225, any additional text deemed important can be extracted from the slide. In this regard, text can be deemed important based upon the characteristics of the text, including the point size of the font, the color, the positioning, or the relationship between the text and any surrounding audiovisual elements, to name a few. In a preferred aspect of the invention, text is considered important when its point size exceeds a pre-determined value, for example eighteen (18) point.

In block 230, the slide itself can be converted to a raster image. In block 235 the raster image can be disposed in a markup language document such as an HTML defined document. In block 240, the image disposed within the document can be annotated with the important text, for instance as "ALT" text associated with an image in an HTML document. In block 245 the title to the slide can be passed to the non-presentation application as can the markup language document. Within the non-presentation application, in block 250 the title can be linked to the image within the markup language document and the title further can be used separately from the image such as within a meeting agenda. Notably, the process can continue through blocks 255 and block 260 for each slide in the slide show until no more slides remain. When no slides remain, the process can end in block 265.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded add executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for converting slide show presentations for use within non-presentation applications, the system comprising:
   a computing system with at least one processor and memory;
   a slide show produced by a slide show presentation application and stored in a native format; and,
   a slide show conversion process executing in the memory of the computing system and coupled to a non-presentation application and programmed to extract a slide title from a slide from said slide show in its native format, to convert the slide in said slide show to raster imagery, to further extract important text that is determined according to a font size of the text in the slide which exceeds a threshold font size, to generate a markup language document, to dispose within the markup language document a reference to the raster imagery, to generate an ALT tag associated with the important text which exceeds the threshold font size, to format the ALT tag to include additional inline indicators for facilitating an audible playback of the important text in the non-presentation application, to annotate the reference with the slide title, and to further annotate the raster image in the markup language document with the ALT tag.

2. The system of claim 1, wherein said slide show conversion process further comprises programming for reducing said raster imagery to a size suitable for display in a pervasive device.

3. A method for converting a slide show presentation for use within a non-presentation application, the method comprising the steps of:
   extracting a slide title for a first slide in a slide show presentation produced by a slide show presentation application executing in memory of a computer;
   converting said first slide with said slide title into a raster image;
   further extracting important text that is determined according to a font size of the text in the first slide which exceeds a threshold font size;
   disposing said raster image of said slide in a markup language document by referencing the raster image in markup language of the markup language document, generating an ALT tag associated with the important text which exceeds the threshold font size, to format the ALT tag to include additional inline indicators for facilitating an audible playback of the important text in the non-presentation application, annotating the reference to the raster image in the markup language document with the slide title, and further annotating the raster image in the markup language document with the ALT tag; and,
   repeating said extracting, converting, further extracting, generating, disposing, annotating, and further annotating steps for a selected group of other slides in the slide show presentation.

4. The method of claim 3, wherein said further extracting step comprises the step of further extracting text having formatting characteristics within said first slide which emphasizes said text.

5. The method of claim 4, wherein said formatting characteristics comprise a point size which exceeds a threshold value.

6. The method of claim 3, further comprising the step of processing said markup language document in the non-presentation application.

7. The method of claim 6, wherein said processing step comprises the step of generating an agenda with each slide title for each raster image in said markup language document.

8. The method of claim 3, further comprising the step of performing each of said extracting, disposing, converting, further extracting, generating, annotating, and repeating steps externally to the slide show presentation application which produced the slide show presentation.

9. The method of claim 3, further comprising the steps of:
   reducing said raster image to a size suitable for display in a pervasive device; and,
   rendering said slide title and said reduced raster image in a pervasive device display.

10. A non-transitory machine readable storage medium having stored thereon a computer program for converting a slide show presentation for use within a non-presentation application, the computer program comprising a routine set of instructions for causing the machine to perform the steps of:
    extracting a slide title for a first slide in a slide show presentation produced by a slide show presentation application executing in memory of a computer;
    converting said first slide with said slide title into a raster image;
    further extracting important text that is determined according to a font size of the text in the first slide which exceeds a threshold font size;
    disposing said raster image of said slide in a markup language document by referencing the raster image in markup language of the markup language document, generating an ALT tag associated with the important text which exceeds the threshold font size, formatting the ALT tag to include additional inline indicators for facilitating an audible playback of the important text in the non-presentation application, and annotating the reference to the raster image in the markup language document with the slide title, and further annotating the raster image in the markup language document with the ALT tag; and, repeating said extracting, converting, further extracting, generating, disposing, annotating, and further annotating steps for a selected group of other slides in the slide show presentation.

11. The machine readable storage of claim 10, wherein said further extracting step comprises the step of further extracting text having formatting characteristics within said first slide which emphasizes said text.

12. The machine readable storage of claim 11, wherein said formatting characteristics comprise a point size which exceeds a threshold value.

13. The machine readable storage of claim 10, further comprising the steps of:

reducing said raster image to a size suitable for display in a pervasive device; and, rendering said slide title and said reduced raster image in a pervasive device display.

\* \* \* \* \*